United States Patent
Branger et al.

[11] Patent Number: 6,052,257
[45] Date of Patent: Apr. 18, 2000

[54] SEALING STRUCTURE FOR REDUCED LUBRICANT LEAKAGE IN A SPINDLE MOTOR

[75] Inventors: Mortiz Branger, Los Altos; Jose Galvan, San Jose; Josef August Hilmer, Morgan Hill, all of Calif.

[73] Assignee: International Business Machines Corporation, Armonk, N.Y.

[21] Appl. No.: 09/167,955

[22] Filed: Oct. 6, 1998

[51] Int. Cl.[7] .................................................. G11B 17/02
[52] U.S. Cl. .................................. 360/99.08; 360/98.07; 360/99.04; 310/67 R
[58] Field of Search .............................. 360/99.08, 98.07, 360/97.02; 310/67 RE, 90, 91

[56] References Cited

U.S. PATENT DOCUMENTS

| | | | |
|---|---|---|---|
| 3,679,277 | 7/1972 | Dohmen | 384/480 |
| 4,458,957 | 7/1984 | Greener | 308/187.1 |
| 4,743,034 | 5/1988 | Kakabaker et al. | 277/53 |
| 5,011,165 | 4/1991 | Cap | 277/80 |
| 5,347,189 | 9/1994 | Chuta et al. | 310/90 |
| 5,386,756 | 2/1995 | Stehle et al. | 83/830 |
| 5,457,588 | 10/1995 | Hattori et al. | 360/99.08 |
| 5,487,608 | 1/1996 | Leuthold et al. | 384/113 |
| 5,522,601 | 6/1996 | Murphy | 277/53 |
| 5,552,650 | 9/1996 | Cap et al. | 310/67 R |

FOREIGN PATENT DOCUMENTS

| | | |
|---|---|---|
| 2 308 504 | 2/1973 | Germany . |
| 53-76809 | 11/1976 | Japan . |
| 53-055106 | 5/1978 | Japan . |
| 3261360 | 11/1991 | Japan . |
| 6-349191 | 12/1994 | Japan . |
| 7-093880 | 4/1995 | Japan . |
| 7-111024 | 4/1995 | Japan . |
| 7-121978 | 5/1995 | Japan . |
| 7255145 | 10/1995 | Japan . |
| 7-308041 | 11/1995 | Japan . |
| 7308042 | 11/1995 | Japan . |
| 08047199 | 2/1996 | Japan . |

*Primary Examiner*—William Klimowicz
*Attorney, Agent, or Firm*—Robert B. Martin

[57] ABSTRACT

A sealing structure for minimizing the leakage of bearing lubricant is described. The sealing structure includes at least one labyrinth seal which is formed between a sealing surface on one component of a spindle motor and a restrictive ring formed on an opposing component of the spindle motor such that the ring projects into close proximity to the sealing surface. One of the components is a rotating component of the spindle motor and the other component is a stationary component of the spindle motor. At least one labyrinth seal includes a splash ring and a relief groove for collecting the lubricant particles that escape from a bearing assembly in the spindle motor.

10 Claims, 5 Drawing Sheets

SEALING STRUCTURE FOR REDUCED LUBRICANT LEAKAGE IN A SPINDLE MOTOR

BACKGROUND OF THE INVENTION

1. Field of the Invention

The present invention relates generally to sealing structures in spindle motors, and in particular, sealing structures having improved geometries for reducing lubricant leakage from bearing assemblies.

2. Description of Related Art

As the hard disk drive industry demands higher performance spindle motors, the bearing assemblies are required to rotate at faster speeds. As the bearings rotate, submicron sized particles from the bearing lubricant often escape from the bearing assemblies into the disk environment. Within the disk environment, one or more disks, and the air around the disks, are rotating within a sealed enclosure. The aerosoling lubricant that escapes from the spindle motor often swirls around with the air in the disk environment and eventually deposits itself on the surface of the disks and/or on the air bearing slider which supports the read/write transducer or "head."

When the disk drive is turned off, the air bearing generated between the rotating disks and the sliders are no longer generated, and the sliders generally come into contact with the disk surface. If one or more sliders "land" in an area that is covered by the bearing lubricant, the sliders will have a tendency to stick to the disk surface during start-up of the disk drive. In order to overcome this sticking force during start-up, a high motor current (to produce higher torque) is necessary, often resulting in damage to the suspension that supports the slider. In severe cases, the disk drive fails to start altogether. Thus, the contamination caused by the bearing lubricant at the head-to-disk interface degrades the performance of the disk drive.

Spindle motors used in conventional hard disk drives often use a sealing structure to minimize the lubricant leakage from one or more bearing assemblies, particularly the lower bearing assembly. Conventional sealing structures include one or more labyrinth seals, which are formed of a sealing surface on one component and a restrictive ring on an opposing component such that the ring projects into close proximity to the sealing surface. Typically, one of the components is a stationary part of the spindle motor and the other component is a rotating part of the spindle motor. The term "seal" generally refers to a tight fitting or closure with some clearance or space between two surfaces. Thus, a sealing structure formed by one or more labyrinth seals provides an intricate path that inhibits, if not prevents, the outward movement of contaminant particles from the spindle motor. Such sealing structures make it possible to considerably reduce the risk of lubricant particles from passing from the inside of the spindle motor into the disk environment.

FIG. 1A illustrates a conventional sealing structure having a single labyrinth seal used in a spindle motor. The labyrinth seal shown in FIG. 1A is used to minimize the lubricant leakage from a lower bearing assembly 110 and is formed between the upper surface of a motor mounting flange 120 and the lower surface of a bearing bushing 130. The bearing bushing 130 supports a bearing assembly 110. The bearing assembly 110 is typically a ball bearing assembly having a stationary portion and a rotating portion. A gap is formed between the rotating and stationary portions of bearing assembly 110. During operation, mounting flange 120 remains stationary while bearing bushing 130 rotates.

When lower bearing assembly 110 is operating at high speeds (i.e., 7200 rpm, 10,000 rpm, etc.), the centrifugal force of the spindle motor causes submicron airborne particles to escape through the gap formed between the rotating and stationary portions of bearing assembly 110. The submicron particles come from the bearing lubricant which is typically a mixture of oil and grease and are often in the form of bubbles.

The centrifugal force causes the particles to escape from bearing assembly 110 through the gap and to move into a clearance 121 between the upper surface of the mounting flange 120, which is stationary, and the lower surface of the bearing bushing 130, which is rotating. Air viscosity and air friction cause the thin layer of air and the air and grease bubbles contained therein, to rotate. This rotation subjects the oil and grease bubbles to a centrifugal force which drives them from the inner diameter toward the outer diameter of the spindle motor as shown by the arrows in clearance 121.

The mounting flange 120 includes a single annular protrusion 125 that extends into a single annular groove formed in bearing bushing 130. The annular protrusion 125 and annular groove 126 are separated by a gap to form the labyrinth seal. Although the sealing structure formed by the single labyrinth seal shown in FIG. 1A is effective enough to prevent some of the bearing lubricant particles from leaking into the disk environment, the centrifugal force is often large enough to force some of the particles out of the labyrinth seal.

Other conventional disk drives use a sealing structure that includes multiple labyrinth seals. For example, Japanese Publication 53-76809, discloses a sealing structure having multiple labyrinth seals 170–172 as shown in FIG. 1B. The multiple labyrinth seal structure 160 increases the constriction effect of a single labyrinth seal, due to the fact that with each passage through a single labyrinth structure, a significant amount of the dynamic pressure of the leakage flow is lost due to flow around sharp edges, thereby maximizing the pressure difference between an inlet 161 and an outlet 162 of the sealing structure 160. As the protruding annular rings are positioned closer towards outlet 162 of the labyrinth seal, the height of the protruding annular rings are shorter. Each annular ring also includes a sharp surface at its outer circumference to increase the dynamic pressure loss of the leakage flow. During the manufacturing of the labyrinth seal, each sharp surface is machined individually, which is time consuming. Although this labyrinth seal may be somewhat effective in preventing lubricant particles from leaking into the disk environment, it is relatively cumbersome to manufacture and therefore not practical from a cost standpoint.

SUMMARY OF THE INVENTION

It is desirable to provide a sealing structure that reduces the leakage of bearing lubricant from a spindle motor assembly.

It is also desirable to provide a sealing structure that is relatively simple and cost efficient to manufacture.

It is further desirable to provide a sealing structure that is effective without requiring multiple labyrinth seals.

A sealing structure for minimizing the leakage of lubricant particles from a bearing assembly is described. The sealing structure includes a rotating structure, a stationary structure, and a splash ring. The rotating structure is positioned to support the bearing assembly. The rotating structure includes a lower annular surface with a single groove, which is defined by first and second side surfaces and a top annular surface. The splash ring is fixedly attached to the first annular side surface. The stationary structure includes an upper annular surface with a single annular protrusion extending into the annular groove of the rotating structure but without contacting any of the surfaces defining the annular groove. The stationary structure includes a circular relief groove for collecting lubricant particles that escape from the bearing assembly.

A method of manufacturing a sealing structure that minimizes the leakage of lubricant particles from a bearing assembly is also described. A rotating structure positioned to support the bearing assembly is provided. The rotating structure includes a groove with a annular side surface. A splash ring is fixedly attached to the annular side surface of the groove. A stationary structure having an upper annular protrusion and a circular relief groove is provided. The annular protrusion is positioned within said groove within contacting the inner surface of said groove.

Other desires, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which.

DESCRIPTION OF THE PREFERRED EMBODIMENTS

The present invention describes a sealing structure for minimizing the lubricant leakage of a bearing assembly in a spindle motor assembly. The sealing surface includes at least one labyrinth seal formed of a sealing structure on one component and a restrictive ring on an opposing component which are separated by a gap. As the spindle motor rotates, the centrifugal force caused by the rotation causes the bearing lubricant, in the form of submicron airborne particles or bubbles, to escape from the spindle motor assembly and into the disk environment. The leakage of the bearing lubricant often degrades the performance of the hard disk drive at the head-to-disk interface.

Although the sealing structure is described in accordance with a spindle motor used in a disk drive, the sealing structure may be extended to various other motor applications that use a similar bearing assembly. Furthermore, the bearing assembly of the present invention is not limited to ball bearing assemblies but may extended to various other bearing assemblies such as fluid dynamic bearing assemblies.

Figure 2:
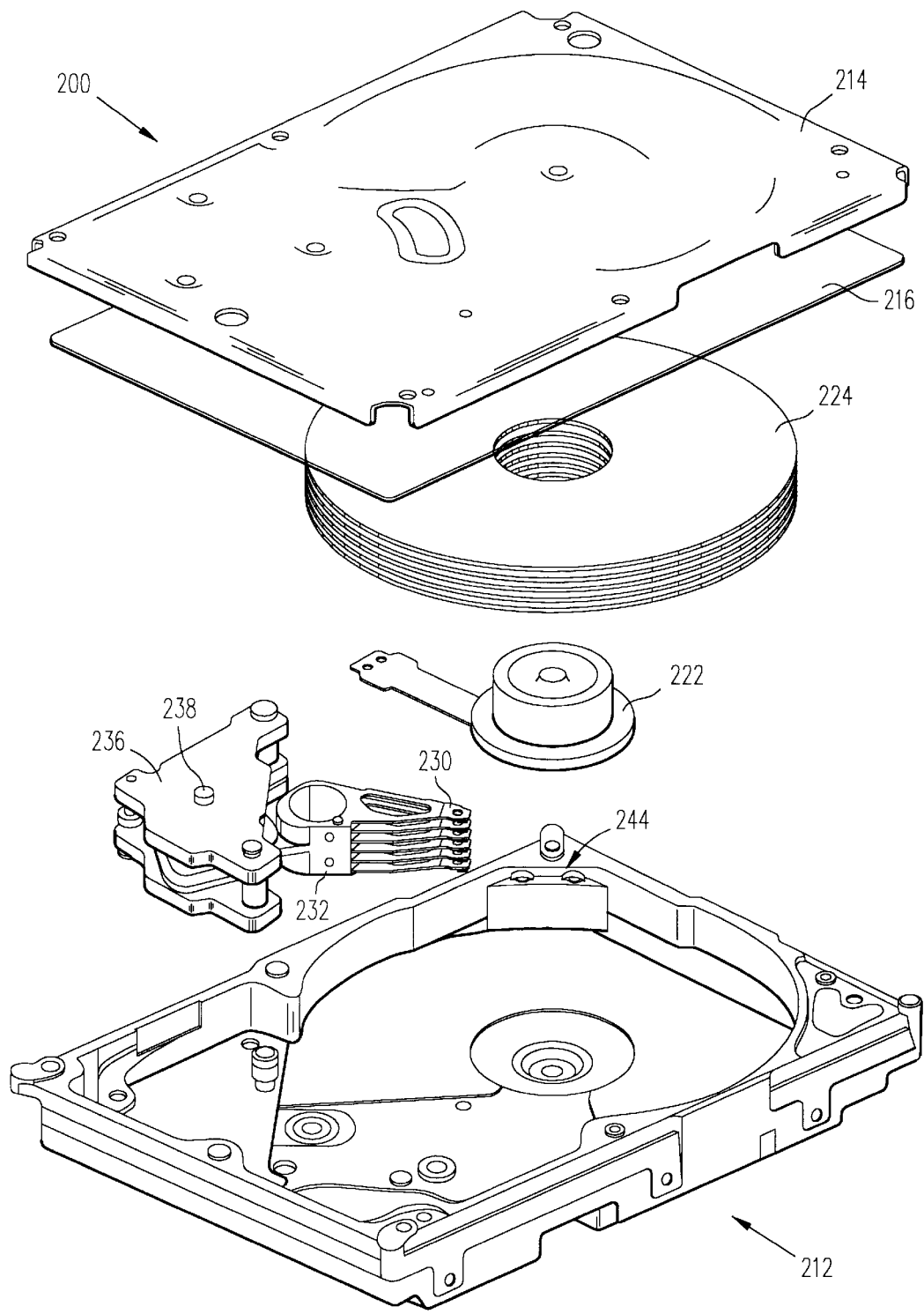
FIG. 2 illustrates an exploded view of one embodiment of a disk drive according to the present invention.

FIG. 2 illustrates an exploded view of a disk drive 200. When assembled, disk drive 200 includes one or more magnetic disks 224. Disks 224 may be conventional particulate or thin film recording disks, which are capable of storing data in the form of magnetic transitions on a series of concentric, closely spaced tracks that form the surface of each disk 224. For one embodiment, both sides of disks 224 are available for storage, and it will be recognized by one of ordinary skill in the art that disk drive 200 may include any number of such disks 224.

Mounted within base plate 212 is a spindle motor assembly 222. Disks 224 are mounted on the hub of spindle motor assembly 222. A spindle motor (not shown) positioned within spindle motor assembly 222, powers the rotation of the spindle motor hub along with disks 224 mounted on the spindle motor hub. A detailed illustration of spindle motor assembly 222 is shown in FIG. 3.

Disk Drive 200 typically includes one transducer or magnetic head (not shown) for each side of a disk 224. Each transducer may include separate read and write elements or a single read/write element. Information is written or read from each disk 224 by a transducer, which is supported by a slider (not shown) coupled to a suspension. The suspensions are attached to an actuator assembly which may include separate actuator arms 230 on an E-block or a comb 232. A voice-coil motor (VC) 236 powers the pivoting of comb 232 on a shaft 238.

Disk drive electronics (not shown) cooperates with the transducers to read data from and write data to disks 224. Writing data to a disk 224 generally involves passing current through the write element of a transducer to produce magnetic lines of flux which magnetize a specific location of the disk surface. Reading data from a specified disk location is typically accomplished by a read element of the transducer sensing the magnetic field or flux lines emanating from the magnetized locations of a disk 224. As the read element passes over the rotating disk surface, the interaction between the read element and the magnetized locations on the disk surface result in the production of electrical signals in the read element. The electrical signals correspond to transitions in the magnetic fields.

Figure 3:
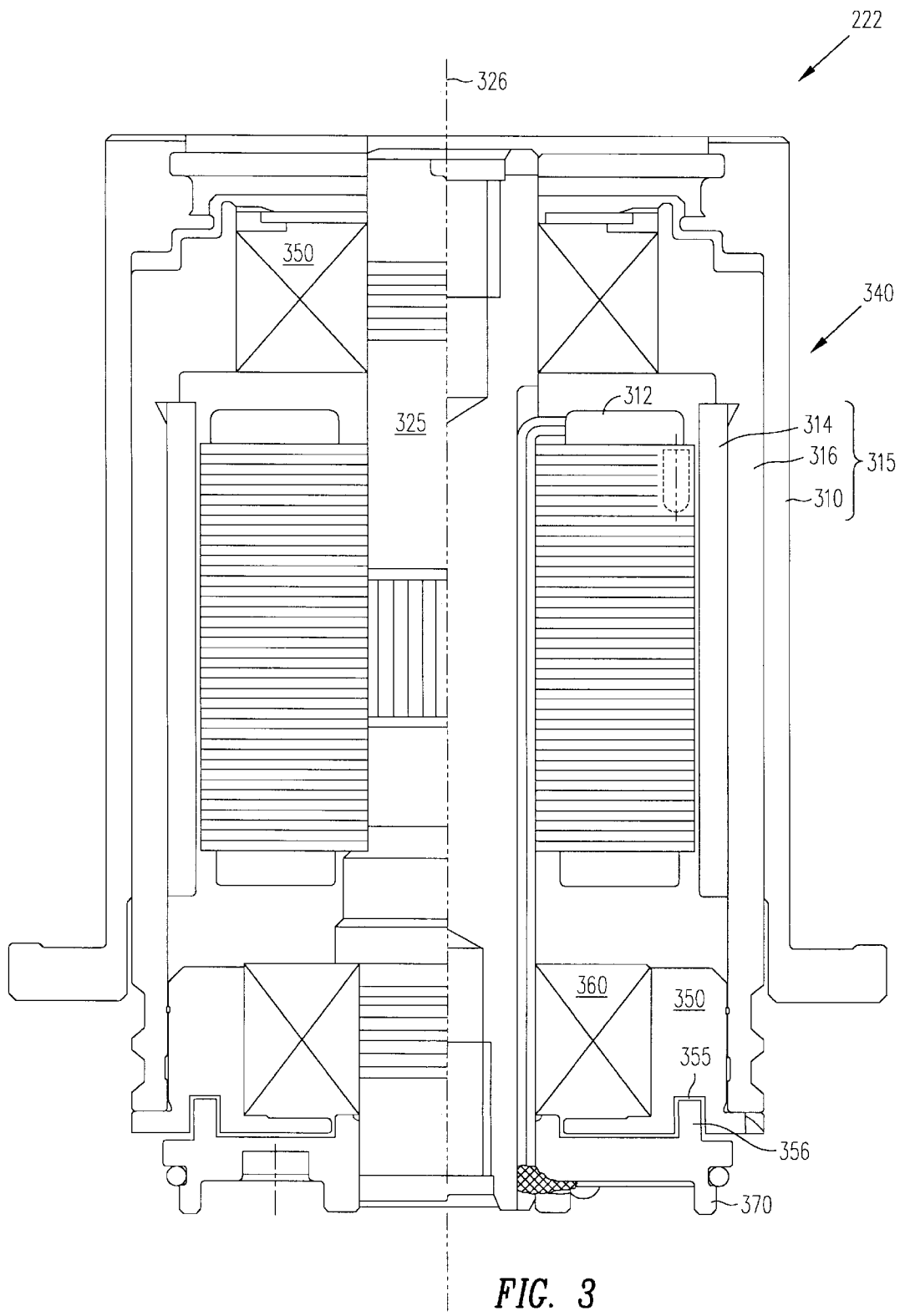
FIG. 3 illustrates a cross-sectional view of one embodiment of a spindle motor according to the present invention.

FIG. 3 illustrates a cross-sectional view of one embodiment of spindle motor assembly 222 in accordance with the present invention. Spindle motor assembly 222 generally includes a rotor 315, a stationary shaft 325, two bearing assemblies 350 and 360, and a stator 312. The rotor 315 includes a rotor magnet 314, a back iron 316 and a hub 310.

Bearing assemblies 350 and 360 typically include a rotating portion and a stationary portion. The stationary portions of bearing assemblies 350 and 360 are attached to the outer periphery surface of stationary shaft 325. A mounting flange 370 is attached to and supports stationary shaft 325. The stator 312 is also attached to stationary shaft 325. Thus, when spindle motor assembly 322 is operating, shaft 325, mounting flange 370, stator 312, and the stationary portions of bearing assemblies 350 and 360 remain stationary.

The rotating portions of bearing assemblies 350 and 360 are attached to and supported by a bearing bushing 350, which is attached to back iron 316. Thus, when the spindle motor 222 is operating, the rotating portions of bearing assemblies 350 and 360 rotate along with bearing bushing 350 and rotor 315. In general, spindle motor 222 rotates with respect to the longitudinal axis 326 of shaft 325. For one embodiment of the present invention, the upper bearing assembly 350 is sealed with a ferrofluid seal and the lower bearing assembly 360 is sealed with a sealing structure such as labyrinth seal 356. A clearance gap 355 is formed between the upper surface of mounting flange 370 and the lower surface of bearing bushing 350. A labyrinth seal 356 is formed near the outer diameter of spindle motor 222. The features of labyrinth seal 356 are described in more detail in accordance with FIG. 4.

Spindle motor 340 may be a brushless dc motor that generally includes stator 312 and rotor magnet 314. The stator 312, which typically includes laminations and copper coils, is pressed onto shaft 325. For one embodiment of the present invention, motor 340 is arranged such that stator 312 is positioned between bearing assemblies 350 and 360. By positioning stator 312 in this manner, optimal efficiency and spindle pitch stiffness is achieved. Rotor magnet 314 is attached to rotor back iron 316, which is attached to the inner peripheral surface of hub 310. Rotor back iron 316 is also used to support the rotating portions of bearing assemblies 350 and 360.

Figure 4:
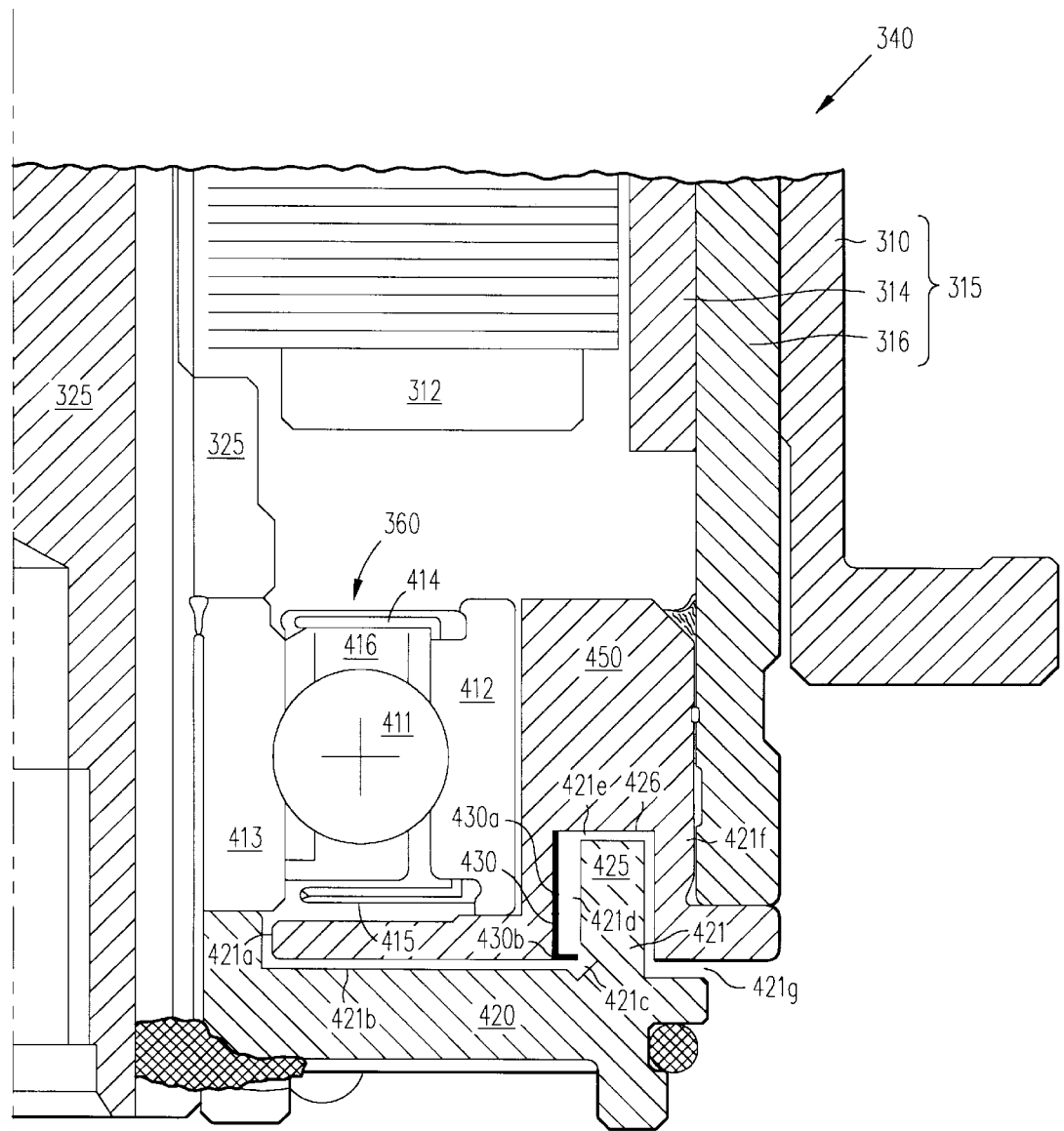
FIG. 4 illustrates a cross-sectional view of one embodiment a sealing structure according to the present invention.

FIG. 4 illustrates one embodiment of a sealing structure of the present invention. The labyrinth structure includes a single labyrinth seal 421 which minimizes or reduces the leakage of bearing lubricant from bearing assembly 360 during operation of a spindle motor assembly. For alternative embodiments of the present invention, the labyrinth structure may include multiple labyrinth seals. For one embodiment of the present invention, bearing assembly 360 is a ball bearing which includes a plurality of steel balls 411 supported by an inner race 413 and an outer race 412. The bearing balls 411 are typically lubricated with a bearing lubricant formed from a mixture of oil and grease. The bearing assembly 360 also includes an upper shield 414, a lower shield 415, and a spacer ring 416. The spacer ring 416 is used to equally separate the plurality of balls 411 around the circumference of bearing assembly 360. Although both upper shield 414 and lower shield 415 are attached to outer race 412, they are separated from inner race 413 by a gap. Thus, bearing assembly 360 may be referred to as a non-contact bearing assembly.

During operation of the spindle motor assembly, a rotating portion of bearing assembly 360 rotates along with bearing bushing 450 and rotor 340, while a stationary portion remains stationary with shaft 325, stator 312, and mounting flange 420. Rotor 340 typically includes rotor magnet 314, rotor back iron 316, and hub 310.

A labyrinth seal 421 is formed between a lower surface of bearing bushing 450 and an upper surface of mounting flange 420. The labyrinth seal 421 is used to minimize the lubricant leakage from lower bearing assembly 360 and the spindle motor assembly into the disk file environment during operation. The labyrinth seal 421 includes inlet 421a, outlet 421g, and gap or clearance regions 421b, 421d, 421e, and 421f. For one embodiment, the various gap regions have different cross-sectional areas for further restricting the flow of particles through labyrinth seal 421. In general, the flow of particles through labyrinth seal 421 is dependent on the cross-sectional area of the various gap regions and the velocity of the flow, which is determined by the pressure differential between inlet 421a and outlet 421g.

Furthermore, labyrinth seal 421 includes a groove region 421c and a splash ring 430. The groove region 421c is also referred to as the collective groove or relive groove 421c because the particles that get flung by splash ring 430 typically collect in groove region 421c. The sealing structure may be referred to as a single labyrinth seal because it includes a single annular protrusion 425 and corresponding annular groove 426.

For high speed disk drives, a spindle motor assembly may rotate at high speeds such as 7,200 rpm or 10,000 rpm when operating. As bearing assembly 360 rotates, small airborne particles from the bearing ball lubricant splashes, causing some of the particles to escape from bearing assembly 360 through opening 421a. The particles may be referred to as bubbles or oil balls. Once the particles escape through gap 421a, the particles have a tendency to travel through a clearance 421b towards the outer diameter of the spindle motor assembly. More specifically, the particles are pushed towards the outer diameter of the spindle motor as a result of the centrifugal force created by spinning air with clearance 421b. For one embodiment, the clearance 421b is less than 0.2 mm, for example 0.15 mm. Typically, it is desirable to make the clearance as small as possible; however, the size of the clearance is often limited by the manufacturing tolerances. Typically, the particles which travel through clearance 421b are about 0.1 microns in diameter.

Figure 1A:
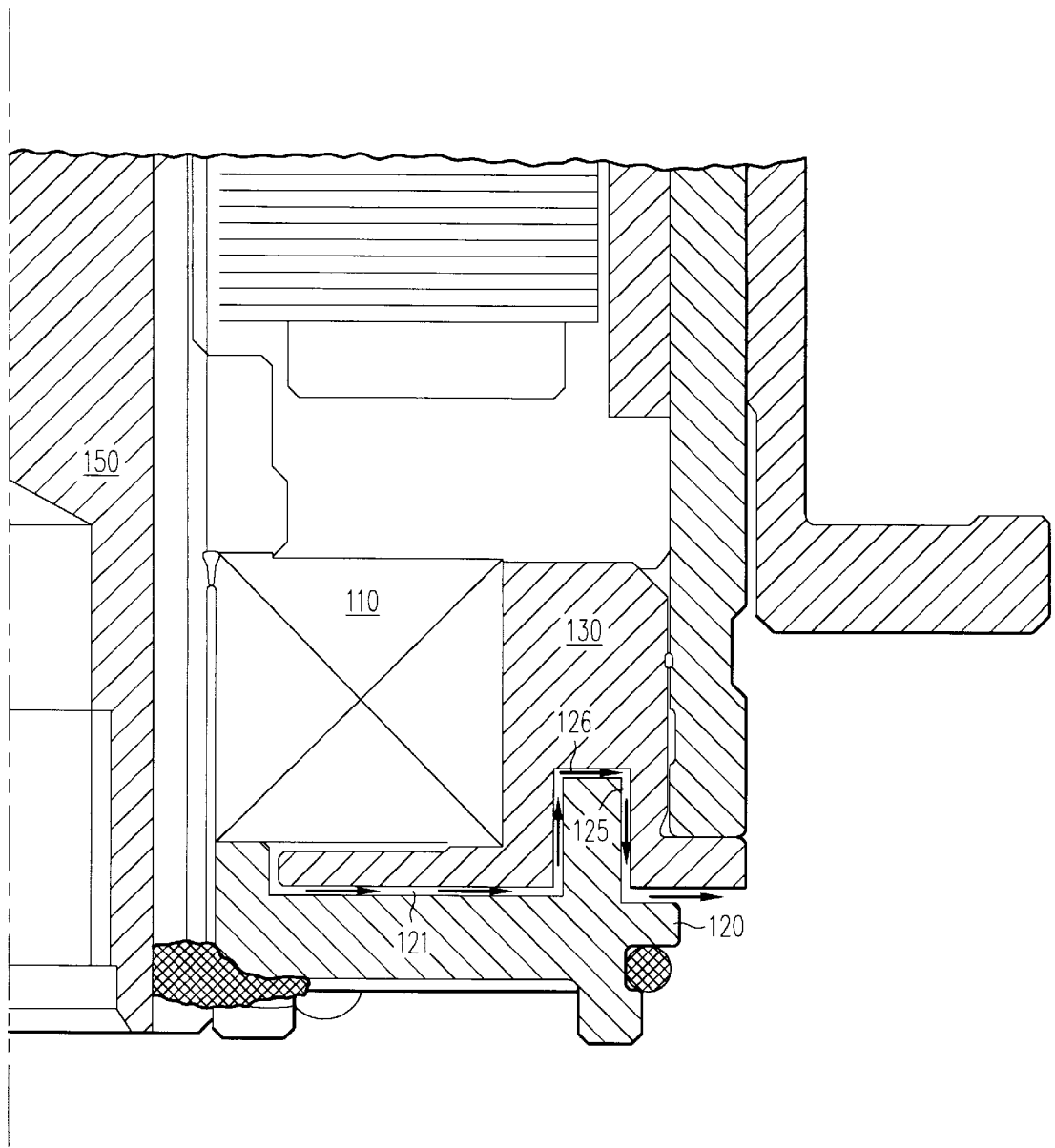
FIG. 1A illustrates a conventional sealing structuring having a single labyrinth seal.
Figure 1B:
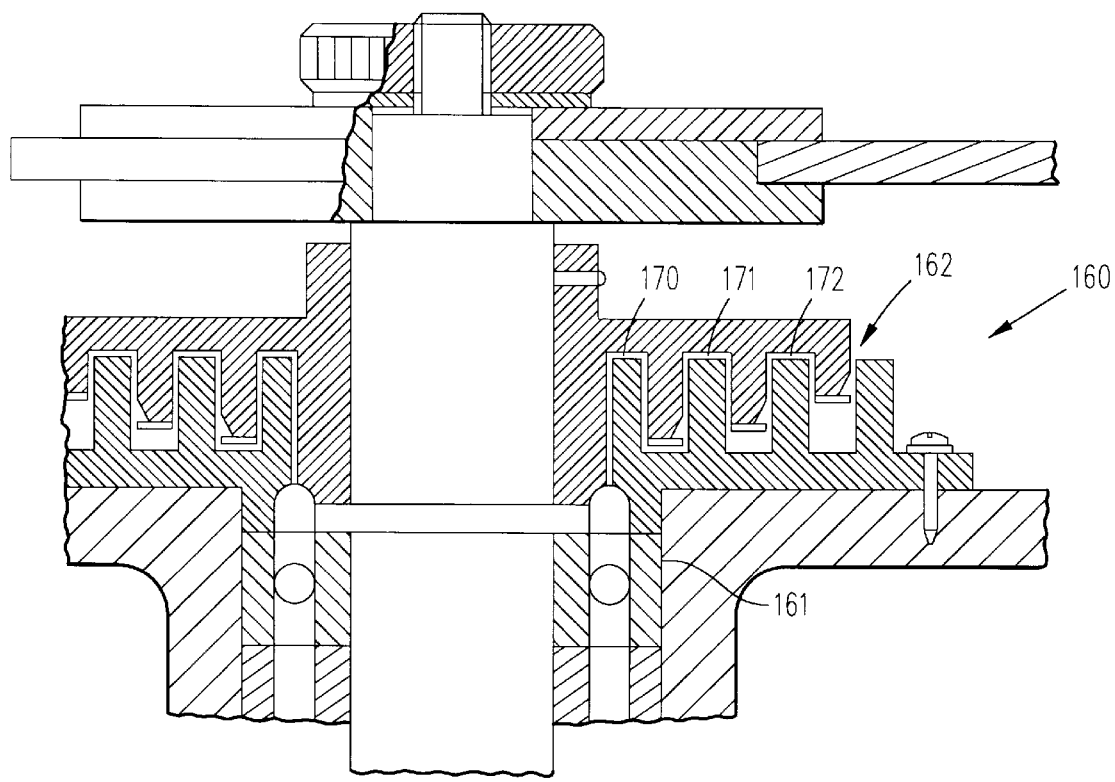
FIG. 1B illustrates a conventional sealing structure having multiple labyrinth seals.
Figure 5:
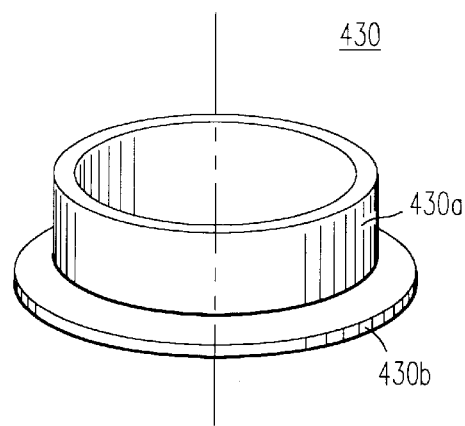
FIG. 5 illustrates one embodiment of a splash ring according to the present invention.

Located at the outer most part of gap region 421b is a splash ring 430. Splash ring 430 is typically a separate structure made from a thin piece of sheet metal, which is pushed onto the bottom shoulder of bearing bushing 450. One advantage of having a separate structure that operates as a splash ring, rather than an integrated structure, is that the splash ring can be easily mass produced with very little added expense. The splash ring of the present invention is typically pressed onto the shoulder of bearing bushing 421 to form an interference fit. On the other hand, an integrated splash ring structure typically requires cumbersome machining which substantially increases the manufacturing costs. Splash ring 430 looks like a topless hat as shown in FIG. 5. More specifically, splash ring 430, a one-piece part, includes a cylindrical top portion 430a and a bottom ring portion 430b. Typically, the particles that reach splash ring 430 get flung from the rotating splash ring and into groove 421c formed on mounting flange 420c. Thus, a majority of the lubricant particles escaping from bearing assembly 360 collect in groove 421c and therefore do not escape into the disk environment. The shape of groove 421c is not limited to a rectangular shaped groove as shown in FIG. 4, but may include various other types of configurations that are sufficient to collect the particles that get flung from splash ring 430.

The particles that are not flung from ring 430 are required to travel around bottom ring portion 430b of splash ring 430 towards top cylindrical portion 430a of splash ring 430. However, these particles encounter much resistance due to the fact that they are traveling inwards, against the centrifugal force of the spinning air.

The particles that make it around the bend formed by bottom ring portion 430b of splash ring 430 are then required to travel up through gap region 421d. For one embodiment, the cross-sectional region of gap region 421d is five times as large as the cross-sectional region of gap region 421b. For example, if the cross-sectional region of gap region 421b is 0.1 mm than the cross-sectional region of gap region 421d is 0.5 mm. The wider cross-sectional region typically decreases the velocity of a given flow gradient. For alternative embodiments, the cross sectional area of gap region 421d is only required to be large enough to slow down the flow gradient through gap region 421d. Thus, many of the particles traveling through gap region 421d collect on the stationary wall of mounting flange 420 that forms gap region 421d and slides down the stationary wall and eventually collects in groove 421c.

The cross-sectional areas of gap regions 421e and 421f are typically much narrower than the cross-sectional area of gap region 421d. By narrowing the cross-sectional areas in the manner, the flow through labyrinth 421 is further restricted because of the boundary layer of the air on these two parts.

Typically, a spindle motor assembly that includes the sealing structure of the present invention is assembled in various subassemblies.

For the lower portion of the spindle motor, lower bearing assembly 360 is typically pushed into bearing bushing 450. The bearing assembly 360 may be pushed far enough such that outer race 412 is in contact with the shoulder of bearing bushing 450. Either before or after bearing assembly 360 is inserted into bearing bushing 450, splash ring 430 is inserted onto bearing bushing 450 at the inner peripheral surface of annular groove 426. The assembly, which includes the lower bearing assembly 360, bearing bushing 450, and splash ring 430, is pushed up into back iron 316 until the flange of bearing bushing 450 is in contact with the bottom surface of back iron 316. At this point, the stationary mounting flange 420 is pushed onto shaft 325 to generally seal the spindle motor assembly.

While the preferred embodiments of the present invention have been illustrated in detail, it should be apparent that modifications and adaptations to those embodiments may occur to one skilled in the art without departing from the scope of the present invention as set forth in the following claims.

We claim:

1. A sealing structure for minimizing the leakage of lubricant particles from a bearing assembly, comprising:
   a rotating structure positioned to support said bearing assembly, said rotating structure having a lower annular surface with a single annular groove, said single annular groove defined by first and second annular side surfaces and a top annular surface;
   a splash ring fixedly attached to said first annular side surface; and
   a stationary structure having an upper annular surface with a single annular protrusion extending into without contacting said first and second annular side surfaces and said top annular surface of said single annular groove, said stationary structure including a circular relief groove for collecting lubricant particles that escape from said bearing assembly.

2. The sealing structure of claim 1, wherein said splash ring includes a cylindrical top portion attached to a bottom ring portion.

3. The sealing structure of claim 1, wherein said splash ring is formed from one thin piece of sheet metal.

4. A spindle motor comprising:
   a stationary shaft;
   a rotor;
   a bearing assembly having a rotatable portion and a stationary portion, said stationary portion attached to said stationary shaft;
   a bearing bushing positioned between said rotor and said rotatable portion of said bearing assembly to support said rotatable portion of said bearing assembly, said bearing bushing having a lower annular surface with a single annular groove, said single annular groove defined by first and second annular side surfaces and a top annular surface;
   a splash ring fixedly attached to said first annular side surface; and
   a mounting flange attached to and supporting said stationary shaft, said mounting flange having an upper annular surface with a single annular protrusion extending into without contacting said first and second annular side surfaces and said top annular surface of said single annular groove to form a sealing structure, said mounting flange including a circular relief groove for collecting lubricant particles that escape from said bearing assembly.

5. The spindle motor of claim 4, wherein said splash ring includes a cylindrical top portion attached to a bottom ring a portion.

6. The spindle motor of claim 4, wherein said splash ring is formed from one thin piece of sheet metal.

7. A disk drive, comprising:
   a disk having a recording surface for storing data;
   at least one transducer for reading data from and writing data to said disk;
   an assembly for positioning said at least one transducer above the recording surface; and
   a spindle motor comprising:
      a stationary shaft;
      a rotor;
      a bearing assembly having a rotatable portion and a stationary portion, said stationary portion attached to said stationary shaft;
      a bearing bushing positioned between said rotor and said rotatable portion of said bearing assembly to support said rotatable portion of said bearing assembly, said bearing bushing having a lower annular surface with a single annular groove, said single annular groove defined by first and second annular side surfaces and a top annular surface;
      a splash ring fixedly attached to said first annular side surface; and
      a mounting flange attached to and supporting said stationary shaft, said mounting flange having an upper annular surface with a single annular protrusion extending into without contacting said first and second annular side surfaces and said top annular surface of said single annular groove to form a sealing structure, said mounting flange including a circular relief groove for collecting lubricant particles that escape from said bearing assembly.

8. The disk drive of claim 7, wherein said splash ring includes a cylindrical top portion attached to a bottom ring portion.

9. The disk drive of claim 7, wherein said splash ring is formed from one thin piece of sheet metal.

10. A method of manufacturing a sealing structure that minimizes the leakage of lubricant particles from a bearing assembly, comprising the steps of:
   (a) providing a rotating structure positioned to support said bearing assembly, said rotating structure including a groove with a annular side surface;
   (b) fixedly attaching a splash ring around said annular side surface of said groove; and
   (c) providing a stationary structure having an upper annular protrusion and a circular relief groove; and
   (d) positioning said annular protrusion within said groove without contacting the inner surface of said groove.

* * * * *